G. W. SOMERVILLE.
TIRE PROTECTOR.
APPLICATION FILED JULY 14, 1920.
1,423,692. Patented July 25, 1922.
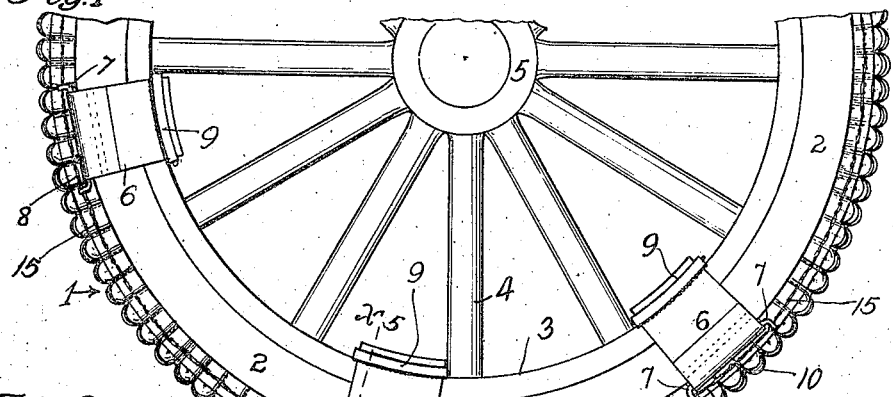
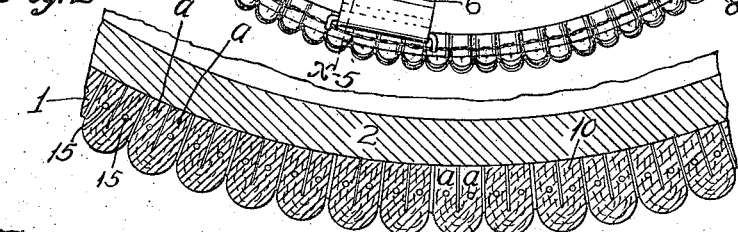
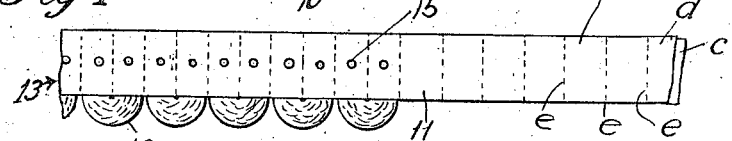
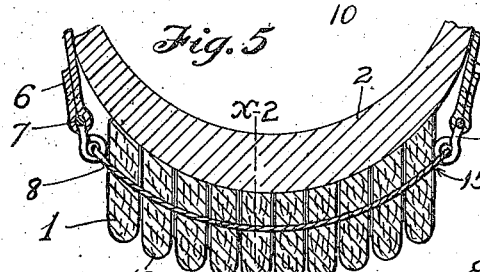
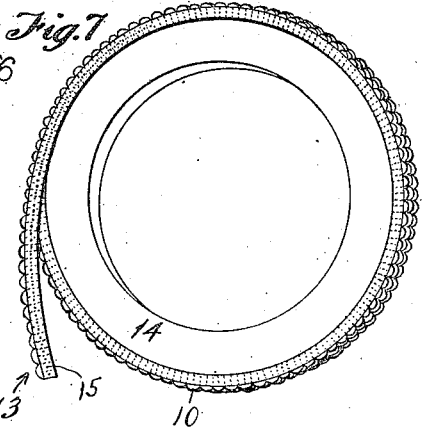
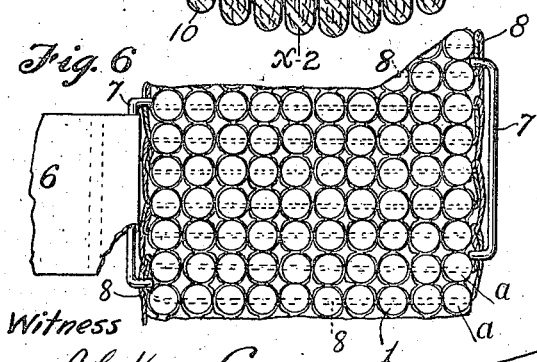
INVENTOR.
George W. Somerville
BY James R. Townsend
his atty.
Witness
A. W. Van Loon

UNITED STATES PATENT OFFICE.

GEORGE W. SOMERVILLE, OF WILMINGTON, CALIFORNIA, ASSIGNOR OF ONE-HALF TO TOWAL NELSON, OF LEBEC, CALIFORNIA.

TIRE PROTECTOR.

1,423,692.   Specification of Letters Patent.   Patented July 25, 1922.

Application filed July 14, 1920. Serial No. 396,080.

*To all whom it may concern:*

Be it known that I, GEORGE W. SOMERVILLE, a citizen of the United States, residing at Wilmington, in the county of Los Angeles, and State of California, have invented a new and useful Tire Protector, of which the following is a specification.

This invention relates to the art of protecting pneumatic tires from contact with the road bed or ground and is broadly new, fundamental, basic and pioneer in that I employ a pocketed canvas strip which has sections of cord inserted therein and which cord sections are adapted to sustain the thrust endwise of said cord sections and it comprises a tread manufactured independently of the tire and adapted to be put onto the periphery of the wheel and to be fastened to the wheel and to be applicable thereto and removable therefrom without interfering with the tire, and which will prevent the rubber on the tire from becoming worn.

An object is to provide a protector having great wear-resisting qualities and also being puncture proof without interfering with the resilient effect of the pneumatic tire.

A feature of novelty resides in the construction of the tire, as will more fully be set forth, in which the protector is made up of woven window cord saturated with a protecting material; said window cord being arranged to sustain the thrust endwise; said cord being disposed with sections thereof radial to the wheel.

An object is to provide a shield or jacket which may be applied to new or old tires on a wheel to prevent wear of the tire proper.

This invention relates to the protection of pneumatic tires and is a departure from the present mode of tire usage in that the protector is not a part of the tire proper, and is an appliance which does not let the true tire come into contact with the road bed or ground. Furthermore it is not sewed or fastened onto the tire as such, but is fastened onto the felly of the wheel on which the tire is applied and can be taken off and put on without disturbing the tire.

An object is to prevent the true tire from wearing out by friction with the ground and to provide for the tire, means which will do all the traction work and take all the wear, thus to greatly prolong the life of the tire and to prevent all deterioration of the tire except such as may come from the weather, and climatic conditions.

While I have preferably used window cord loops in carrying out the invention, I do not limit my invention to the specific use of window cord but may employ any known braided cords which are adapted to serve the purpose described.

Other objects, advantages and features of invention may appear from the accompanying drawing, the subjoined detail description and the appended claims.

The accompanying drawing illustrates the invention.

Figure 1 is a fragmental side elevation of my newly invented tire protector applied to a wheel, a portion of which is shown.

Fig. 2 is a fragmental section on line $x^2$, Fig. 5, on a larger scale than Fig. 1 showing the construction of the protector as applied on a tire.

Fig. 3 is a side elevation of one of the bent woven window-cord sections, detached.

Fig. 4 is a fragmental side elevation of a pocketed canvas strip with a number of cord sections inserted in some of the pockets ready for application to a vehicle wheel. Other pockets are empty.

Fig. 5 is a fragmental transverse section on line $x^5$, Fig. 1, showing the invention applied on a pneumatic tire, a fragment of which is shown.

Fig. 6 is a developed plan of the inside of the protector shown in Figs. 1 and 5.

Fig. 7 is a perspective view illustrating the operation of constructing the jacket on a form which is shown with the cord filled strip spirally wound thereon throughout almost the entire length of said strip.

The tire protector comprises an annular built-up jacket 1 conformed to and adapted to fit upon the periphery of the pneumatic tire 2 of a wheel which is shown as having a felly 3, spokes 4 and hub 5; said jacket being secured to the wheel by suitable fastening means as the canvas straps 6, hinged to the jacket by suitable means as the links 7 and strong connections as the wires 8 which are in the form of a thin flexible strong wire cable sewed back and forth through the jacket from side to side of the wheel. Said cable is preferably made of suitable non-corrosive material.

The fastening means are secured on the inside of the felly of the wheel by any suitable form of fastening, as the buckles 9, by which the ends of the straps are buckled together.

The jacket 1 in its preferred form, is largely formed of sections 10 of braided or woven window cord. Said braided window cord is preferred because of its resistance to unraveling.

The main characteristics aside from such resistance to unravelling resides in the fact that the protector is made up of radial bodies of resilient fibrous material so arranged that the direction of thrust upon the jacket is axial of the sections and as the jacket becomes worn, the wearing away is upon a surface that is transverse to the fibers which make up the protector sections.

As shown in the drawing said protector sections 10 are preferably made of cord bent into loops as indicated in most of the views. The loops being of sufficient length to afford parallel limbs $a$ which are united together in two ways.

One of the units in the construction of the protector, consists of a pocketed strap formed of two strips $c$, $d$ of canvas or other strong flexible material sewed together at seams $e$, to form loops 11, each of which is adapted to receive one leg $a$ of the loops of cord.

In practical manufacture two strips, $c$, $d$ of canvas or other strong material of indefinite length will be joined side by side and will be stitched transversely as at $e$ to form the pockets 11, the circumference of which pockets is slightly greater than the circumference of the cord. The cords are preferably about one-fourth of an inch, more or less in diameter; and this necessitates making the space between the seams $e$ of the strip somewhat greater than the diameter of the cord. For instance the space between seams will be about three-eighths of an inch for cords one-fourth inch in diameter.

The strips will preferably be of sufficient length to allow the entire jacket to be made of one continuous looped and filled strip, wound edgewise spirally side by side upon a required form around an axis.

The continuous looped strip 13 filled with the cord sections in the pockets or loops 11, is saturated or filled with a protecting composition which is preferably composed of white lead, white ocher and linseed oil in proper proportions; that is to say, satisfactory results would be obtained by mixing the ingredients in the proportions of $4\frac{1}{2}$ to 5 gallons of raw linseed oil to 50 pounds of white lead and 50 pounds of white ocher. Said composition is mainly composed of the ingredients named, although equivalents may be used.

It is also desirable to add litharge to the composition just stated in the proportion of about 1 pound of litharge to 100 pounds of white lead and white ocher combined; the purpose of this being to more rapidly oxidize the linseed oil.

In practice the oil and the white lead, and white ocher will be thoroughly mixed together by stirring; and after the mass is well mixed, the litharge will be added and the mass again stirred thoroughly. Then the composition thus made will preferably be heated sufficiently to give it greater penetrating qualities, but not sufficient to injure the fiber of either the canvas or the cord. Before assembling the bent cord sections in the canvas, said cord sections or bends are saturated with warm raw linseed oil; the object being to cause said linseed oil to penetrate so that the braided or woven window cord will be thorough saturated. The object of this is to give a proper amount of rigidity to the cord; to protect the cord against water, and give it greater wearing power. It also assists in keeping the cord from unravelling.

After the cord sections have been inserted in the pockets, the strip of corded canvas will be dipped in the warm composition of lead, ocher, oil and litharge above referred to and then the strip will be wound edgewise upon a circular form 14 having a diameter corresponding to that of the tire to be protected.

After the pocketed strip has been supplied with the cord sections and solidified by the oil and lead composition referred to, said strip is bored with holes 15 and in the operation of winding the corded strip upon the form, the manufacturer will insert placing wires or pins, not shown, through the perforations 15 successively as the winding proceeds so as to keep the holes in alignment with each other. Each wire being thrust onward through the successive holes as they come into position to receive the ends of the wires; the placing wires being arranged entirely around the form in a manner which is readily understood and is not necessary to illustrate.

When the winding is completed, the holes 15 arranged in transverse alignment are sewed through with a strong connection. The flexible wire cable as at 8, is adapted to serve the purpose and protect it against rust, will be sewed through the holes as the placing wires are withdrawn one after the other. The jacket when completely sewed, will consist of the transversely corded strip 13 extending spirally around, and the flexible line as the cable 8 extending through the jacket from edge to edge.

After the winding and sewing have been completed the jacket thus formed will be dipped in the paint preparation which is of a sufficiently fluid character to penetrate the seams and cavities and to thoroughly coat the jacket outside and in. This protects the cords and strip from moisture.

The fastening straps 6 may be applied to the tired wheel in such manner as to prevent any creeping of the protector around the tire. To this end adjoining straps 6 may come against spokes 4 oppositely as indicated in Fig. 1 so that contact with some of the spokes prevents creeping in one direction and vice versa.

It is noted that the lines or wires 8 may be fine non corrodible wire picture cord and that the holes therefor will be as small as practicable so as to not weaken the cord sections or make them likely to tear out. The flexible wire allows the jacket to snugly fit the various transverse contours of tires.

I claim.

1. A tire protector comprising an annular built-up jacket composed of cord sections formed into loops, flexible means for holding said cord sections together, said jacket being adapted to fit upon the periphery of a wheel provided with a rubber tire and means to fasten said jacket on said wheel.

2. A tire protector comprising an annular jacket built up of sections of woven cord arranged radially and flexible means to hold said sections together.

3. A tire protector comprising an annular jacket built up of a pocketed strip of fabric wound edgewise with windings side by side to form an annulus, and sections of cord in the pockets of said strip.

4. A tire protector comprising an annular jacket built up of a pocketed strip; cord sections in the pockets of said strip; said cord sections being arranged radially and saturated with linseed oil, and provided with transverse holes; and a connection sewed through said holes and holding the strips and sections in place.

5. A tire protector comprising an annular jacket built up of a pocketed strip and having cord sections in the pockets of said strip and arranged radially, and filled with a protecting composition.

6. A tire protector comprising an annular jacket built up of a pocketed strip and having cord sections in the pockets of said strip and arranged radially, and filled with a protecting composition composed principally of linseed oil, white lead and white ochre.

7. A tire protector composed of canvas strips sewed transversely to form pockets and arranged side by side in annular form to fit a wheel; said pockets having cord sections therein radial to the annulus thus formed; means to fasten the corded strips together and a cementing and protecting composition in said strips and cord sections.

8. A tire protector comprising a jacket constructed with strips of woven cord wound edgewise side by side around an axis, and flexible means to hold the strips together.

9. The combination with the strips wound edgewise, side by side around an axis, of flexible means to unite and hold the strips together; straps hinged to the united strips; and means to fasten the straps around the felly of a wheel.

10. The combination with an annular jacket composed of cord sections, of a wire cable sewed transversely of the periphery of the tire through said cord sections, and means attached to said wire cable to secure said annular jacket to the felly of a wheel.

11. The combination with an annular jacket composed of cord sections of a wire cable sewed therethrough; straps hinged to said cable, and buckles to secure the straps around the tire and felly of a wheel.

12. A tire protector comprising an annular jacket built up of a pocketed strip; cord sections in the pockets of said strip; said cord sections being arranged radially and provided with transverse holes; a flexible connection sewed through said holes and holding the strips and sections in place; and means attached to said flexible connection to secure said jacket to the felly of a wheel.

13. A tire protector composed of canvas strips sewed transversely to form pockets and arranged side by side in annular form to fit a wheel; said pockets having looped cord sections therein radial to the annulus thus formed; means to fasten the corded strips together and a cementing and protecting composition in said strips and cord sections.

14. A tire protector comprising an annular jacket built up of a pocketed strip; cord sections in the pockets of said strip; said cord sections being arranged radially and provided with transverse holes; a flexible connection sewed through said holes and holding said strips in place.

15. A tire protector comprising an annular jacket built up of a pocketed strip; cord sections in the pockets of said strip; said cord sections being arranged radially and saturated with linseed oil, and provided with transverse holes; a connection sewed through said holes and holding the strips and sections in place, and means attached to said connection to secure said jacket to the felly of a wheel.

In testimony whereof, I have hereunto set my hand at Los Angeles, California, this 7th day of July, 1920.

GEORGE W. SOMERVILLE.

Witness:
JAMES R. TOWNSEND.